US 7,003,110 B1

(12) United States Patent
Jakobsson et al.

(10) Patent No.: US 7,003,110 B1
(45) Date of Patent: Feb. 21, 2006

(54) SOFTWARE AGING METHOD AND APPARATUS FOR DISCOURAGING SOFTWARE PIRACY

(75) Inventors: Bjorn Markus Jakobsson, Hoboken, NJ (US); Michael Kendrick Reiter, Raritan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 963 days.

(21) Appl. No.: 09/712,335

(22) Filed: Nov. 14, 2000

(51) Int. Cl.
*H04L 9/00* (2006.01)
*H04L 9/32* (2006.01)
*G06F 11/30* (2006.01)
*G06F 12/14* (2006.01)

(52) U.S. Cl. .......................................... 380/45; 726/26
(58) Field of Classification Search ................ 380/45; 726/26
See application file for complete search history.

(56) References Cited

U.S. PATENT DOCUMENTS 5,784,464 A * 7/1998 Akiyama et al. ........... 713/155
5,870,468 A * 2/1999 Harrison .................... 713/165

OTHER PUBLICATIONS

Sheriff Software Development Kit, www.sheriff-software. com, 2 pages, Nov. 2000.
Microsoft Clip Art Gallery Live, cgl.microsoft.com/clipgallerylive, 6 pages, Nov. 2000.
McAfee Secure Cast/Active Shield, www.McAfee.com, 3 pages, Nov. 2000.

* cited by examiner

Primary Examiner—Gilberto Barron, Jr.
Assistant Examiner—Grigory Gurshman

(57) ABSTRACT

A software program is configured in accordance with a software aging process such that one or more files generated by the program are at least partially encrypted using a cryptographic key associated with a current time interval for which the files are generated. The cryptographic key may be a symmetric key used for both encryption and decryption operations, such that cryptographic key used for encryption in a given interval is also required to decrypt files encrypted during that interval. Periodic updates of the software program are provided to a legitimate user of the software program, with a given one of the updates including a different cryptographic key associated with a subsequent time interval. The cryptographic key associated with a particular one of the time intervals may be common to each of a set of legitimate copies of the software program that have received the corresponding version of the periodic update. The variation of the cryptographic keys from one interval to another discourages unauthorized use of the software program by deliberately requiring both legitimate and illegitimate users to request unusually frequent updates, thereby substantially increasing the tracing and prosecution risks borne by software pirates.

15 Claims, 3 Drawing Sheets

SOFTWARE AGING METHOD AND APPARATUS FOR DISCOURAGING SOFTWARE PIRACY

FIELD OF THE INVENTION

The invention relates generally to computer software, and more particularly to techniques for discouraging unauthorized dissemination and use of computer software.

BACKGROUND OF THE INVENTION

It is well known that software piracy is a large commercial problem. According to a recent study by the Business Software Alliance, www.bsa.org, the computer industry loses $11 billion annually to piracy, with 40 percent of all software programs pirated. Software piracy is a crime that traditional legal and technical methods to a large extent fail to prevent, primarily due to the low cost of the crime and the inherent impossibility of preventing data copying.

One conventional approach to protecting against piracy is to require users to register their software programs. An example of this approach is implemented by the Sheriff Software Development Kit, www.sheriff-software.com. However, this approach only protects software that has not been manipulated by a pirate, and therefore is directed more towards preventing copying between friends than professional piracy.

It is also known to utilize other types of interaction between users and distributors in order to protect against piracy. There are a number of different commercial products that use these types of interaction. One such product, Microsoft Clip Art Gallery Live, cgl.microsoft.com/clipgallerylive, allows only registered users to access a large repository of clip art. The distributor can then verify that the access frequencies for each user remain at a reasonable level, thereby discouraging massive cloning of the accessing software.

Traditionally, and independent of the above-noted piracy concerns, users generally want to have their software updated, e.g., in order to get rid of known bugs, to add security patches, to add new functionality, and to keep their software compatible with other programs. Numerous techniques for software updating are known in the art. For example, one commercial product, McAfee Secure Cast/Active Shield, www.McAfee.com, initially provides users with a free virus detecting program and a limited number of free updates, but makes subsequent updates available only by paid subscription. In many cases, updates to software are done on roughly an annual basis, as there is not much need for more frequent updates, and as the cost and inconvenience of more frequent updates is substantial using conventional updating techniques.

The above-mentioned updating techniques have generally not been applied in a manner specifically designed to discourage software piracy. Furthermore, as previously noted, existing techniques for discouraging software piracy are inadequate. A need therefore remains in the art for a more efficient and effective approach to discouraging software piracy.

SUMMARY OF THE INVENTION

The invention solves one or more of the above-noted problems of the prior art by providing a software aging method and apparatus which force frequent updates of software for both legitimate and illegitimate users in a manner which discourages software piracy.

In accordance with one aspect of the invention, a software program is configured such that one or more files generated by the program are at least partially encrypted using a cryptographic key associated with a current time interval for which the files are generated. The cryptographic key may be a symmetric key used for both encryption and decryption operations, such that the cryptographic key used for encryption in a given interval is also required in order to decrypt files encrypted during that interval. Periodic updates of the software program are then provided to a legitimate user of the software program, with each of the updates including a different cryptographic key associated with a subsequent time interval. The cryptographic key associated with a particular one of the time intervals may be common to each of a set of legitimate copies of the software program that have received the corresponding version of the periodic update. The periodic updates need not provide any alteration of the functionality of the program, but are instead designed to discourage piracy of the program through alteration of the cryptographic key used to encrypt files generated by the program.

In accordance with another aspect of the invention, each file generated by the software program in a given time interval may be labeled with a plaintext identifier of the time interval. The time interval identifier uniquely identifies a particular cryptographic key that may be used to decrypt an encrypted portion of a file for that interval.

In accordance with a further aspect of the invention, the cryptographic key associated with the current time interval may be computable as a function of the cryptographic key associated with the subsequent time interval, using a publicly-known one-way function. This avoids the need to store old cryptographic keys, and also avoids the need to refresh previously-encrypted files using a new cryptographic key after a given update.

In accordance with yet another aspect of the invention, files generated by the software program for a current time or time interval t using the corresponding cryptographic key are readable only by copies of the program that have received an update corresponding to at least an interval t-$\delta$, where $\delta$ is a designated number of time intervals for which compatibility between current and previous versions is desired.

The invention provides a number of advantages over the conventional techniques described previously. For example, the variation of the cryptographic keys from one time interval to another in accordance with the invention discourages unauthorized use of the software program by deliberately requiring both legitimate and illegitimate users to request unusually frequent updates, thereby substantially increasing the tracing and prosecution risks borne by software pirates. In addition, the periodic updates may be implemented in a manner which is substantially transparent to the legitimate users of the software program.

DETAILED DESCRIPTION OF THE INVENTION

The present invention will be illustrated below in conjunction with an exemplary system in which the software aging techniques of the invention are implemented over the Internet or other type of communication network. It should be understood, however, that the invention is more generally applicable to any type of electronic system or device application in which it is desirable to discourage software piracy. For example, although well-suited for use with communications over the Internet or other computer networks, the invention can also be applied to numerous other software-related applications, including applications based on smart cards or other electronic devices.

Figure 1:
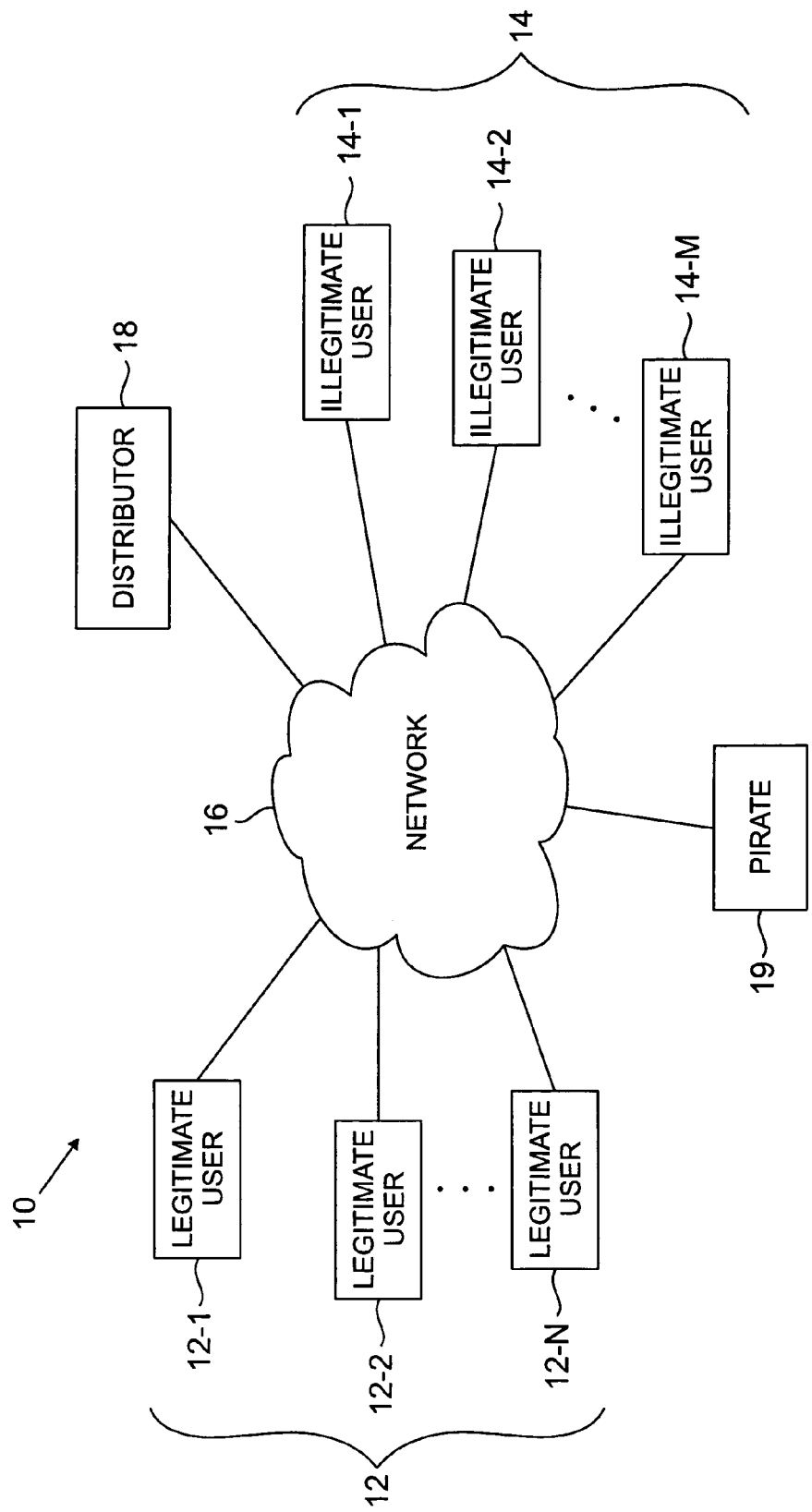
FIG. 1 shows an illustrative embodiment of a computer system in which software aging in accordance with the invention may be implemented.

FIG. 1 shows an exemplary system 10 in which software aging techniques may be implemented in accordance with the invention. The system 10 includes a set 12 of N legitimate users 12-1, 12-2, . . . 12-N, and a set 14 of M illegitimate users 14-1, 14-2, . . . 14-M, with each of the users 12-i, i=1 . . . N, and 14-j, j=1, . . . M, being coupled to a network 16. Also coupled to the network 16 is a software distributor 18 and a software pirate 19. The network 16 may be a local area network, a metropolitan area network, a wide area network, a global data communications network such as the Internet, a private "intranet" network or any other suitable data communication medium, as well as portions or combinations of such networks or other communication media. For example, elements 12 and 18 may be connected by one network, while elements 14 and 19 are connected by another network. Numerous other interconnection arrangements may also be used.

Figure 2:
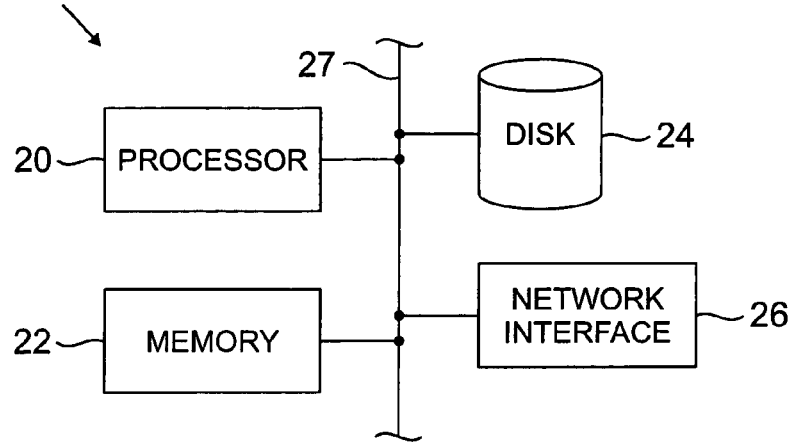
FIG. 2 is a block diagram of one possible implementation of a given one of the elements of the system of FIG. 1.

FIG. 2 shows one possible implementation of a given one of the elements 12-i, 14-j, 18 or 19 of system 10. In this example implementation, the element of system 10 includes a processor 20, an electronic memory 22, a disk-based memory 24, and a network interface 26, all of which communicate over a bus 27. One or more of the elements 12-i, 14-j, 18 or 19 of system 10 may thus be implemented as a personal computer, a mainframe computer, a computer workstation, a smart card in conjunction with a card reader, or any other type of digital data processor as well as various portions or combinations thereof. The processor 20 may represent a microprocessor, a central processing unit, an application-specific integrated circuit (ASIC), or other suitable processing circuitry. It should be emphasized that the implementation shown in FIG. 2 is simplified for clarity of illustration, and may include additional elements not shown in the figure. In addition, other arrangements of processing elements may be used to implement one or more of the elements of the system 10.

The elements 12-i, 14-j, 18 and 19 of system 10 execute software programs in accordance with the invention in order to provide software aging in a manner to be described in detail below. The invention may be embodied in whole or in part in one or more software programs stored in one or more of the element memories, or in one or more programs stored on other machine-readable media associated with the elements of the system 10.

The present invention in an illustrative embodiment provides software aging techniques that discourage software piracy by making it less economically viable. The primary threat addressed in the illustrative embodiment is that in which the pirate 19 obtains, potentially alters, and then distributes copies of a software program to the illegitimate users 14 in order to make a profit. It should be noted that the illustrative embodiment does not address situations in which several mutually trusting and coordinating users buy a software program together, or in which piracy is done for notoriety or disruptive purposes rather than for a profit, although one or more aspects of the invention may nonetheless be applicable in such situations.

In the illustrative embodiment, it is assumed that the distributor 18 sells software, keeps a list of registered users, and maintains a service for software updates for the legitimate users 12. It is further assumed that the goal of the distributor is to maximize its profit, and to discourage pirated versions of its software from being used. It should be noted that these and all other assumptions made herein are for illustrative purposes only, and should not be construed as limiting the scope of the invention in any way.

The legitimate users 12 purchase software from the distributor 18 or a related entity, and obtain updates from the distributor over the network 16. These users want their software to be as close as possible to the "ideal" implementation provided by the distributor in terms of functionality. As will be described in detail below, an advantage of the privacy protection of the present invention is that it can be implemented in a manner which is substantially transparent to the legitimate users, i.e., in a manner which minimizes negative side effects such as processing delays and increased file sizes.

The pirate 19 in the illustrative embodiment is assumed to obtain the software sold by the distributor 18, and to redistribute potentially altered copies of the software to the illegitimate users 14 for a charge. It may also be assumed that the pirate has access to the source code of the software, and is capable of altering and re-compiling the software in order to remove any protection mechanisms implemented by the distributor. The goals of the pirate are to maximize profit and minimize the risks of discovery and prosecution.

The illegitimate users 14 obtain software from the pirate 19. Like the legitimate users, the illegitimate users want their software to be as close as possible to ideal, again in terms of the functionality provided. Additionally, the illegitimate users want to maximize their profit, by buying the software at "piracy discount," and want to minimize the risks of software failure. It is assumed in the illustrative embodiment that the illegitimate users generally do not cooperate with one another, but rather interact only with the pirate for the purposes of obtaining software. In accordance with the invention, if the software of the illegitimate users is not updated, then these users will not have software that is interoperable with that of the legitimate users. It may still be possible for the illegitimate users to exchange files with each other. However, the software aging process of the invention is configured such that the illegitimate users will require updates in order to achieve full interoperability with legitimate users.

It should be noted that if a legitimate software program is run on more machines than its license allows, only those users requesting an update before the limit is reached are considered legitimate, and the remaining users are considered illegitimate. The illustrative embodiment provides piracy protection in such a situation as long as the machines do not coordinate their updates.

The illustrative embodiment of the invention is designed to force the pirate 19 to be responsible for providing regular updates of pirated software to the illegitimate users 14. This requires that the pirate and the illegitimate users remain in contact. More particularly, the pirate must be able to contact or be contacted by the illegitimate users, via electronic means over the network 16 or otherwise. The ongoing contact requirement increases the legal risks for the pirate.

For example, it would allow "infiltrators" to discover the pirate and take action to trace him. This threat also increases the risks of the pirated software to the illegitimate users, as these users will be forced to rely on updates from a pirate that may either disappear to avoid tracing or be successfully traced and taken out of business.

The above-noted forced interaction between the pirate and the illegitimate users may be achieved in the illustrative embodiment by letting the distributor 18 supply software updates only to registered, legitimate users 12. When one of the illegitimate users 14 contacts the distributor for an update, that user is required to provide a registration number. If the number is invalid, the distributor may supply a random update, rather than the most recent update, thereby efficiently corrupting the operation of the pirated software. If the number is valid, it allows the distributor to partially trace the pirate from software distribution lists. The distributor may also supply a random update if it has already updated the software for the given user in a particular time period, which would indicate that an additional copy of the update has been requested by the same user.

In view of the forced interaction, the pirate would have to alter the portion of the pirated software that requests updates in a way that it either automatically contacts the pirate or awaits an update from the pirate. Such an alteration would need to be made in every piece of pirated software sold, and can be implemented via modification of the software to include a network address for the pirate or by other techniques. If an alteration of this type is not implemented, then illegitimate users will be refused updates, which will lower the value of the pirated software to them, and therefore also the potential profit to the pirate.

The illustrative embodiment is particularly well-suited for use with software programs that generate files, messages or other outputs that may need to be interpreted by other instances of the same program. All such outputs are generally referred to herein as "files." Examples of programs of this type include wordprocessors, spreadsheet packages, web browsers, and networked games. However, the techniques of the invention can be extended in a straightforward manner to any type of program, e.g., through the use of a hierarchical approach in which a corresponding operating system is configured to require both itself and all the programs it runs to be updated. It should be noted that the question of compatibility does not only arise for explicit files, but also for implicit files, such as buffers used for cut and paste operations. Although it may appear sufficient for the operating system simply to require the programs it runs to be updated, rather than be updated itself, this would allow a pirate to circumvent the protection by disabling the portion of the operating system that forces the programs it runs to be updated. Requiring the operating system to be updated also ensures that the pirate has to supply illegitimate users with operating system updates.

A number of conflict resolution issues arise in the illustrative embodiment of the invention. A first such issue relates to potential synchronization problems. Such problems may arise, e.g., if a connection between a legitimate user and the distributor is interrupted during the transfer of an update. A typical approach to such synchronization problems in existing systems is to re-execute the same sequence of steps. However, such an approach is inadequate in the illustrative embodiment of the invention because it would allow a pirate to clone software that automatically "hangs up" after having received the update, thereby allowing another clone to claim that the connection was interrupted right before the last step. A more sophisticated re-execution should be used which ensures that this problem is avoided but legitimate users are not denied updates.

Another conflict resolution issue relates to a repentant illegitimate user. It may be desirable in certain applications to allow illegitimate users to become legitimate, e.g., by paying a designated fee. In such an arrangement, the pirate is used by the distributor much like an advertiser handing out samples that work for a limited time period. This corresponds functionally to selling the software using an on-line protocol, although it may require less information to be transferred.

In the illustrative embodiment, the success of the piracy protection depends on the frequency of the required updates. For example, one possible implementation may require that weekly or bi-weekly updates be automatically made. Note that it is not sufficient to force legitimate users to perform these updates. The illustrative embodiment is therefore configured such that both the legitimate users and the illegitimate users are forced to make updates. As will be described in greater detail below, this can be done by configuring the software such that the updates are required for proper operation.

In an example updating process to be described below in conjunction with FIG. 3, files output by the software contain a version-dependent number that affects how the file should be interpreted when read or written. In order for software of illegitimate users to be compatible with that of legitimate users, or more specifically, for the software of the illegitimate users to be able to interpret files received from legitimate users, the illegitimate software must be approximately as up-to-date as the legitimate software that created the files. To enforce this, the software may be configured, e.g., to contain a short piece of secret information that, together with the version number of the software, allows interpretation of files that are as old as or older than the software, where the age of the software is measured in terms of the version number. As will be described in detail below, the illustrative embodiment achieves this goal, while also allowing new software versions to interpret both old and new files.

The functional changes embodied in the updates should not be predictable, since the pirate could then implement these updates directly and thus avoid the need for the illegitimate users to request updates. Similarly, it should be infeasible for an isolated program, i.e., that of an illegitimate user, to determine the functional updates, e.g., by observing files from properly updated pieces of software.

Figure 3:
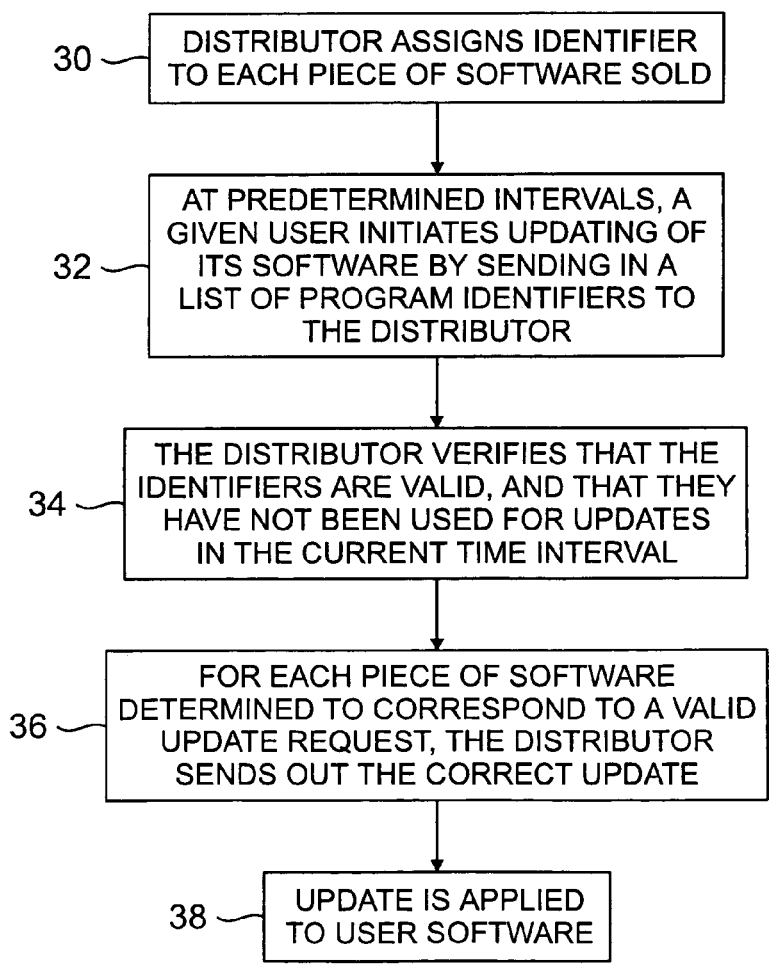
FIGS. 3 and 4 are flow diagrams of example software updating and software aging processes, respectively, in accordance with the invention.

FIG. 3 is a flow diagram showing the software updating process of the illustrative embodiment of the invention. The updating process is initialized in step 30 by the distributor assigning an identifier to each piece of software it sells. This could be done by incorporating the identifier in the software itself, or using a paper document from which the user copies the identifier at the time of installation, or by other techniques well known in the art. Identifiers may be, e.g., non-repetitive random elements selected from a suitable sparse space of such elements using conventional techniques.

Step 32 indicates that, at predetermined intervals, a legitimate user initiates updating of its software by sending in a list of program identifiers to the distributor. The distributor in step 34 verifies that these are valid identifiers, and that they have not been used for updates during a current updating time interval. A valid identifier in conjunction with no previous update request for the current interval is indicative of a legitimate user. If the distributor grants multiple licenses to a particular user site, then the updating may be performed in a coordinated manner, or the distributor may allow a number of updates corresponding to the number of licenses. In step 36, for each piece of software that is determined to correspond to a valid update request, the distributor sends out the correct update. The update is then applied to the user software in step 38.

An update request may be determined to be invalid, e.g., if there is no identifier registered, or if the maximum number of updates have already been performed for the time interval. An invalid identifier is indicative of an illegitimate user. In the case of an invalid update request, the distributor may simply refuse the request. As another example, the distributor may respond to the invalid update request by sending a random update. The distinction between a correct update and a random update will be described in greater detail below in conjunction with the software aging process illustrated in FIG. 4. In general, a correct update, once applied to the user software, makes this software functionally current with other updated copies of the software, such that files produced by one can be read by the other, and partially backwards compatible with out-of-date copies, such that the software can read files produced by out-of-date software, but out-of-date software cannot read files it produces. A random update, once applied to the user software, renders that software ineffective in reading any files created by other copies of the program, whether current or out-of-date.

The illustrative embodiment as described in conjunction with FIGS. 1 and 3 involves only a single distributor. However, the techniques described may be extended in a straightforward manner to any number of multiple distributors. The multiple distributors may operate independently or cooperate with one another in the software updating process.

The updates referred to in FIG. 3 may be transferred from the distributor to a legitimate user over a communication channel established over the network 16 in a conventional manner. If the channel is a public communication channel or includes one or more potentially insecure links, encryption may be applied to the updates. For example, a symmetric encryption technique may be used in which the user identifier operates as a shared secret key for identification purposes, and is augmented with a portion used for encryption.

If a transmission from the distributor to a user is interrupted during an update, the user generally has to request another update. A number of techniques may be used to ensure that the distributor does not mistake such a repeated request for a separate request made by an illegitimate copy of the software.

One such technique involves the use of a failure counter. For example, each user could record in a local counter its number of failed update attempts, and this number may be transmitted with a given update request. This allows the distributor to distinguish between a repeated transmission from a legitimate user and an independent transmission by an illegitimate user, since as previously noted it is assumed for the illustrative embodiment that illegitimate users do not cooperate with one another.

Another possible technique is for the distributor to allow automatically a specified low number of repeated update requests. For example, a maximum of five such repeated requests could be permitted. This will prevent large-scale piracy while eliminating problems relating to interrupted transmission for legitimate users, since it is unlikely that an update attempt will fail more than five times.

Yet another possible technique is for the distributor to require the user to call a toll-free number to "roll back" the update state after a failed updating attempt. In this case, the distributor may verify the originating number for the call or other user information before allowing roll-back to the previous update state.

Various combinations of the above techniques could also be used, as well as other techniques not explicitly described.

The updating process of FIG. 3 may also facilitate pirate tracing, in the following manner. For each update request that is recorded as being initiated by an illegitimate user, the distributor can attempt to determine a cluster of illegal copies associated with the copy used by that user. The cluster may be indexed by the identifier of the user software, as well as other available information. Similar techniques may be applied to pirate software recovered by other means. The distributor is thereby better able to determine the extent and source of the piracy problem.

Figure 4:
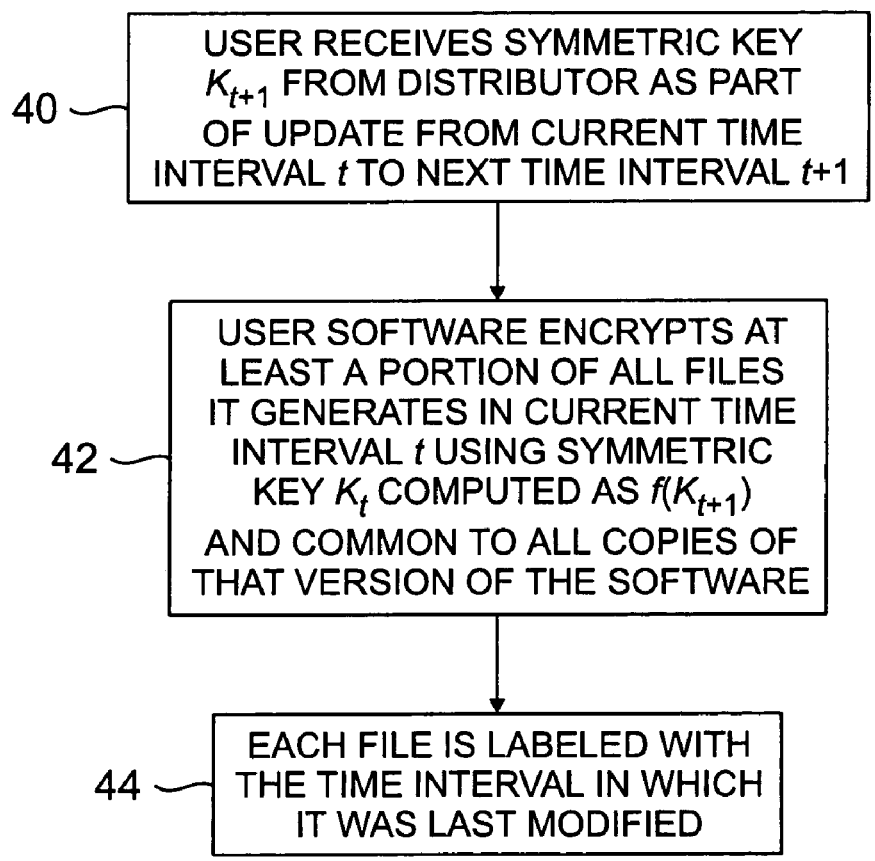

FIG. 4 is a flow diagram showing the software aging process of the illustrative embodiment of the invention. As previously noted, the software aging of the present invention is designed to force all users to perform frequent automatic updates, such that piracy is discouraged.

In step 40, a user receives a symmetric key $K_{t+1}$, as part of an update of a piece of user software from a current time interval t to a subsequent time interval t+1. In step 42, the user software encrypts at least a portion of all files it generates in the current time interval t using a symmetric key $K_t$ which is computed from the key $K_{t+1}$ for the next interval. More particularly, $K_t = f(K_{t+1})$, where $f$ is a public one-way function that is infeasible to invert for the pirate. The distributor may have a trap-door key allowing it to invert the function $f$. As another example, the distributor may start with a value $K_T$ from which all previous values down to an initial value $K_0$ are computed. In this case, a value T exceeding an anticipated number of update intervals is selected. For example, assuming that no piece of software has a life exceeding one hundred years, and assuming weekly updates, an appropriate value for T is 5200. In step 44, each file is labeled with the time interval in which it was last modified. This labeling, by identifying the time interval, specifies the key with which encryption was performed. The label itself may be in plain text, i.e., unencrypted.

The software aging process of FIG. 4 is thus configured such that the user software encrypts at least a portion of each file it generates, using a symmetric key common to all copies of that version of the software. Each file also is labeled with the time interval in which it was last modified, which indicates the key with which encryption was performed.

Advantageously, the above-described aging process avoids the need to refresh all files when a key update is performed, and the need to store all old keys, by allowing old keys to be computed from new keys. It should be noted, however, that the new keys cannot be computed from the old keys.

The above-noted correct update sent to a legitimate user at the transition from interval t to t+1 includes the key $K_{t+1}$, which the legitimate user uses to replace its old key. The correct update may also include patches to the software to add new features, fix newly-discovered security problems, etc. The above-noted random update sent to a detected illegitimate user may contain a random number in place of $K_{t+1}$. It may also include patches to the software that actively corrupt the software, so that it will no longer execute. Note that even if the illegitimate user detects the random update and prevents it from being applied to its software, the utility of its software will continue to degrade because it cannot read files output by later versions of the software and thus encrypted by $K_{t+1}$ or a later key.

The software aging process of FIG. 4 may utilize any known type of encryption technique. For example, the invention can be implemented using a symmetric cipher, such as the well-known Data Encryption Standard (DES) described in NBS FIPS Pub 46-1, U.S. Department of Commerce, 1988, which is incorporated by reference herein. It should be noted that a symmetric cipher of this type is safe for use in the software aging process of the invention, even if not considered safe in a general setting. This is because the software aging process need only protect against individual users being able to decrypt messages or establish the key from seen messages. It need not provide the same level of protection against the pirate, since if the pirate determines the decryption key, it would have to distribute it to all of its illegitimate users anyway, which increases the risk of tracing and prosecution. If the pirate were to invert the encryption scheme and thereby obtain the keys or corresponding plaintexts, it could build this information into the unauthorized copies of the software that it distributes to the illegitimate users. The legitimate distributor could then respond by altering the keys to make incorrect the unauthorized software generated by the pirate. Therefore, it is possible to use a somewhat weak cipher in the illustrative embodiment. However, stronger ciphers could also be used, such as the Rijndael cipher recently selected for use as the Advanced Encryption Standard (AES). Additional details regarding the Rijndael cipher can be found at, e.g., http://www.esat.kuleuven.ac.be/~rijmen/rijndael/, and http://csrc.nist.gov/encryption/aes. Additional details regarding other cryptographic techniques suitable for use in conjunction with the present invention can be found in, e.g., A. J. Menezes et al., "Handbook of Applied Cryptography," CRC Press, 1997, which is incorporated by reference herein.

In the illustrative embodiment, the same symmetric key is distributed to all legitimate users, such that each of these users can correctly interpret encrypted files generated by the others. Again, this is not a security flaw, even though it will be very easy for the pirate to obtain the symmetric key. For example, the pirate may in fact be one of the legitimate users and therefore receive the key automatically. The software aging process is designed to force the illegitimate users to receive the key via updates from the pirate.

It should be noted that the function f in the software aging process of FIG. 3 does not have to remain infeasible to invert over the life of the software, but instead need only require sufficient computational effort to invert for it to be inconvenient for the illegitimate users to do so in every time interval. In the event an attack allowing fast inversion of the function becomes known, a new function should be selected and deployed. All software will then need to be updated to "refresh" all files of the old format. This updating can be performed using an intermediary version having knowledge of both the old key and the new key, and the corresponding one-way functions.

The software aging process of FIG. 3 can be configured to allow for flexible updates. Such an arrangement can make new files readable to a software version that is not necessarily updated to exactly the same version. More particularly, instead of using the most recently distributed key $K_t$ for encrypting files in time interval t, the software may instead use an encryption key $K_{t-\delta+1}$, where $\delta$ reflects the updating frequency necessary for a piece of software to be able to read new files from legitimate users. For example, the value of $\delta$ may be set to 3, thereby allowing programs two updates "behind" to read new files. Other values could also be used, as appropriate for a given application.

It should be noted that the term "time interval" as used herein is intended to include both periodic and non-periodic intervals, as well as other time designators used to indicate a particular time period, such as start times, end times, particular points in time, etc.

The updating and aging processes described in conjunction with FIGS. 3 and 4 may be implemented using so-called middleware that intercepts system calls, such as open, read, write, etc. and processes these calls to provide the desired operations. For example, the middleware may intercept every file read request made by a given user program, replacing the read request with a read followed by a decryption operation. Similarly, file write requests made by the given program may be intercepted and replaced by encryption and write requests. This allows an efficient conversion of existing programs to provide programs configured with piracy protection in accordance with the invention. It may also be beneficial to incorporate the above-described middleware functionality directly into application programs.

As noted previously, the software aging process of the present invention protects against piracy by forcing the pirate to distribute frequent updates to illegitimate users. Advantageously, the protection is provided in a manner which is substantially transparent to legitimate users.

The burdens placed on the pirate as a result of the software aging process of the invention will now be described more formally. It is assumed that the pirate does not collude with legitimate users. For example, if a user performs updates for another user, the first user is considered to be part of the pirate organization. As noted above, the variable $\delta$ is a measure of the update frequency necessary for compatibility. It can be shown that in order for the software of the illegitimate users to work without a significant degradation of functionality at any particular time, the pirate needs to update at least M—$cn\delta$ of the illegitimate users 14 at least every $\delta$ time intervals on average, where n is the maximum number of updates the distributor allows to a particular copy of the software in a given interval, and c is the number of software packages the pirate has legally purchased from the distributor. It can also be shown that the software of a legitimate user will work without significant degradation of functionality at any time as long as the user manages to connect to the distributor at least every $\delta$ time periods.

It should be understood that the above-described embodiments of the invention are illustrative only. For example, the invention can be applied to any type of software and to any arrangement or configuration of users, distributors and pirates. In addition, any of a variety of different encryption techniques may be used. Furthermore, the invention can be used to provide additional advantages beyond piracy protection, such as facilitating administration of software rentals or subscriptions for an application service provider via appropriate charging for receipt of the above-described updates. These and numerous other alternative embodiments within the scope of the following claims will be apparent to those skilled in the art.

What is claimed is:

1. A method of discouraging unauthorized use of a software program, the method comprising the steps of:

configuring the software program in accordance with a software aging process such that one or more files generated by the program are at least partially encrypted using a first cryptographic key associated with a current time interval for which the files are generated; and providing periodic updates of the software program to a legitimate user of the software program, a given one of the periodic updates including at least a second cryptographic key associated with a time interval subsequent to the current time interval.

2. The method of claim 1 wherein at least a subset of the periodic updates do not provide any alteration of the functionality of the program but instead discourage piracy of the program through alteration of the cryptographic key used to at least partially encrypt outputs generated by the program.

3. The method of claim 1 wherein the files generated by the program for the current time interval and at least partially encrypted using the first cryptographic key are readable only by programs having a corresponding decryption key.

4. The method of claim 3 wherein the first cryptographic key and the corresponding decryption key comprise a common symmetric cryptographic key used for both encryption and decryption.

5. The method of claim 1 wherein the first cryptographic key is computable as a function of the second cryptographic key using a publicly-known one-way function.

6. The method of claim 1 wherein each file generated by the software program in a given time interval is labeled with an identifier of the time interval.

7. The method of claim 6 wherein the time interval identifier uniquely identifies a particular cryptographic key that may be used to decrypt an encrypted portion of a file for that interval.

8. The method of claim 1 wherein the first encryption key is common to each of a plurality of legitimate copies of the software program that have received a corresponding version of the update.

9. The method of claim 1 further including the step of providing periodic random updates of the software program to one or more illegitimate users, a given one of the random updates including a random number in place of an cryptographic key associated with a correct update.

10. The method of claim 1 wherein files generated by the software program for a current time interval t using the first cryptographic key are readable only by copies of the program that have received an update corresponding to at least an interval t-$\delta$, where $\delta$ is a designated number of time intervals for which compatibility between current and previous versions is desired.

11. The method of claim 1 wherein at least a subset of the periodic updates are provided to the legitimate user over a network connection established with a distributor of the software program.

12. The method of claim 1 wherein at least a subset of the periodic updates are provided to the legitimate user in an automatic manner so as not to be apparent to an operator of the software program.

13. The method of claim 1 wherein the legitimate user is identified as such by a distributor through the use of an identifier associated with one of a number of known legitimate copies of the software program.

14. An apparatus for discouraging unauthorized use of a software program, the apparatus comprising:
a memory for storing at least a portion of the software program; and
a processor coupled to the memory and operative to execute at least a portion of the software program, wherein the software program is configured in accordance with a software aging process such that one or more files generated by the program are at least partially encrypted using a first cryptographic key associated with a current time interval for which the files are generated;
wherein periodic updates of the software program are provided to a legitimate user of the software program, a given one of the periodic updates including at least a second cryptographic key associated with a time interval subsequent to the current time interval.

15. A machine-readable medium containing a software program, executable on a digital data processor comprising a processor and a memory, configured in accordance with a software aging process such that one or more files generated by the program are at least partially encrypted using a first cryptographic key associated with a current time interval for which the files are generated, wherein periodic updates of the software program are provided to a legitimate user of the software program, a given one of the periodic updates including at least a second cryptographic key associated with a time interval subsequent to the current time interval, such that the variation of cryptographic keys from one of the intervals to another of the intervals discourages unauthorized use of the software program.

* * * * *